United States Patent Office 2,992,281
Patented July 11, 1961

2,992,281
PREPARATION OF FLUOROFORM
Franciszek Olstowski, Freeport, and John Joseph Newport III, Lake Jackson, Tex., assignors to The Dow Chemical Company, Midland, Mich., a corporation of Delaware
No Drawing. Filed June 4, 1959, Ser. No. 817,985
4 Claims. (Cl. 260—653.6)

This invention relates to a novel process for preparing fluoroform. More particularly, this invention relates to the interaction of carbon tetrafluoride and hydrogen fluoride in the presence of carbon.

A co-pending application discloses that hydrogen will react with carbon tetrafluoride to yield fluoroform. However, this process involves some net destruction of the fluorocarbon and loss of some of the fluorine from the carbon atom to a hydrogen atom. The present application discloses that fluoroform may be prepared without any substantial destruction of the fluorocarbon and no substantial loss of fluorine to a hydrogen atom, the hydrogen atom being bonded to a fluorine atom as hydrogen fluoride. And, any fluorocarbon produced, such as $C_2F_6$ or $C_2F_4$, can be recycled with the hydrogen fluoride to yield additional fluoroform.

An illustrative procedure of our invention consists of heating a gaseous mixture of a fluorocarbon or fluorohalocarbon containing up to 3 carbon atoms and hydrogen fluoride in the presence of carbon, as by passing through a graphite resistance tube heated by an electric current to a temperature above 1800° C., rapidly quenching the product gases and separating fluoroform from the reaction mixture by fractional distillation. This reaction may be characterized by the following equations:

(1) $CF_4 + C \rightarrow 2CF_2$:
(2) $CF_2: + HF \rightarrow CF_3H$

Saturated and unsaturated fluorocarbons and the fluorocarbon monochlorides and monobromides, may be used as starting materials. For example, $C_2F_4$, $C_2F_6$, $C_3F_8$, $C_3F_6$, $CF_3Cl$ and $CF_3Br$, may be used as well as $CF_4$ to obtain our results.

Any form of carbon, whether amorphous or crystalline, is suitable for the purpose of this invention. Preferably, we empoly a graphite resistance tube through which we pass the gaseous mixture of hydrogen fluoride and fluorocarbon.

The fluorocarbon will be passed through the reactor together with hydrogen fluoride in a reaction ratio of from about 10:1 to 1:10 moles of hydrogen fluoride to fluorocarbon. Preferably, we employ a reactant ratio of 2 moles of hydrogen fluoride to 1 mole of fluorocarbon.

The reactor will be heated to temperatures in excess of 1800° C. At temperatures materially below 1800° C., no significant reaction takes place with carbon tetrafluoride and hydrogen fluoride. Substantial conversions and yields were obtained in a temperature range of from about 1800° C. to about 2100° C. Preferably, we employ a temperature of 2000° C.

Contact times, as expressed herein, are based on the time the reactant gases spend in that portion of the reactor that is within 100° C. of the temperature indicated for the reaction. In our process, the contact times will generally be within the range of from about 0.001 second to about 10 seconds. Preferably, we employ a contact time of about 0.01 second.

Our process will usually and preferably be carried out at substantially atmospheric pressures, that is, a pressure of 1 or 2 atmospheres absolute. However, the reaction is not sensitive to variations in pressure, and higher or lower variations usually have little or no effect on the results.

Particular emphasis is placed upon the quenching or cooling time in our process. In order to obtain our results, it is essential that the product vapors are rapidly cooled from the reaction temperature to a temperature below 600° C. at a rate within the time range of from about 0.02 second to about 1 second. Quenching times greater than 1 second resulted in the fluoroform degrading to carbon tetrafluoride and hydrogen fluoride.

The following example is given to illustrate our invention but is not to be construed as limiting our invention thereto.

*Example*

The reactor consisted of a carbon resistance tube with an outside diameter of ⅜ inch and an inside diameter of ⅛ inch. Approximately 6 inches of the tube was estimated to be at the reaction temperature. Heat was applied to the reactor by passing approximately 100 to 200 amperes D.C. through the tube at a potential of about 5 to 10 volts.

Carbon tetrafluoride, flowing at one cubic foot per hour, and hydrogen fluoride, flowing at two cubic feet per hour were premixed and passed through the reaction tube. The contact time of the reactants at 2000° C. was estimated to be of the order of 0.01 second. The product gases from the reactor were quenched by cold wall techniques to less than 600° C. in less than 1 second. The product gases were scrubbed with a sodium hydroxide solution to neutralize any unreacted hydrogen fluoride.

Acid-free, vapor-phase chromotographic analysis showed the reaction mixture to contain 53.4 mol percent $CF_4$, 12.3 mol percent $C_2F_6$, 13.0 mol percent $C_2F_4$ and 21.5 mol percent $CF_3H$.

In a manner similar to that of the foregoing example, trifluoromethyl chloride or trifluoromethyl bromide, hexafluoroethane, octofluoropropane, pentafluoroethylchloride and bromide, and heptofluoropropyl chloride and bromide, and the like may be substituted for the carbon tetrafluoride specifically shown with the production of fluoroform and substantially the same results.

Various modifications may be made in the present invention without departing from the spirit and scope thereof and it is understood that we limit ourselves only as defined in the appended claims.

We claim:
1. A process of preparing fluoroform which comprises contacting hydrogen fluoride and a compound selected from the class consisting of fluorocarbons containing up to 3 carbon atoms and their monochlorides and monobromides, in the presence of carbon and at a temperature ranging from about 1800° C. to about 2100° C. for a contact time ranging from about 0.001 second to about 10 seconds, rapidly quenching the product gases from the reaction temperature to a temperature below 600° C. within the time interval of from about 0.02 second to about 1 second, and separating fluoroform from the reaction product.

2. A process of preparing fluoroform which comprises contacting hydrogen fluoride and a compound selected from the class consisting of fluorocarbons containing up to 3 carbon atoms and their monochlorides and monobromides, in the presence of carbon and at a temperature of 2000° C. for a contact time ranging from about 0.001 second to about 10 seconds, rapidly quenching the product gases from the reaction temperature to a temperature below 600° C. within the time interval of from about 0.02 second to about 1 second, and separating fluoroform from the reaction product.

3. A process of preparing fluoroform which comprises contacting hydrogen fluoride and carbon tetrafluoride in the presence of carbon and at a temperature ranging from about 1800° C. to about 2100° C. and for a contact time ranging from about 0.001 second to about 10 seconds, rapidly quenching the product gases from the reaction temperature to a temperature below 600° C. within the time interval of from about 0.02 second to about 1 second, and separating fluoroform from the reaction product.

4. A process of preparing fluoroform which comprises containing hydrogen fluoride and carbon tetrafluoride in the presence of carbon and at a temperature of 2000° C. for a contact time of about 0.01 second, rapidly quenching the product gases from the reaction temperature to a temperature below 600° C. within a time interval of from about 0.02 second to about 1 second, and separating fluoroform from the reaction product.

References Cited in the file of this patent

UNITED STATES PATENTS 2,709,183   Farlow et al. _____ May 25, 1955